United States Patent [19]

Tsuchiyama et al.

[11] Patent Number: 4,746,734
[45] Date of Patent: May 24, 1988

[54] PARTIALLY METHYLATED CYCLODEXTRINS AND PROCESS FOR PRODUCING THE SAME

[75] Inventors: Yukio Tsuchiyama, Yokohama; Michikatsu Sato, Fujisawa; Yoshiaki Yagi, Fujisawa; Tomoyuki Ishikura, Chigasaki, all of Japan

[73] Assignee: Sanraku Incorporated, Tokyo, Japan

[21] Appl. No.: 20,250

[22] Filed: Feb. 27, 1987

Related U.S. Application Data

[63] Continuation-in-part of Ser. No. 830,394, Feb. 18, 1986, abandoned.

[30] Foreign Application Priority Data

Feb. 28, 1985 [JP] Japan .............................. 60-040291

[51] Int. Cl.$^4$ ............................................ C08B 37/00
[52] U.S. Cl. ..................................................... 536/103
[58] Field of Search ........................... 536/103; 514/58

[56] References Cited

U.S. PATENT DOCUMENTS 4,542,211 9/1985 Szejtli et al. .................... 536/103

Primary Examiner—Ronald W. Griffin
Attorney, Agent, or Firm—Jordan and Hamburg

[57] ABSTRACT

Partially methylated cyclodextrins with enhanced solubility in water have an average degree of methylation of hydroxyl groups at different positions in all the glucose units involved of about 53–64% for the 2-position, about 38–51% for the 3-position and about 70–100% for the 6-position. The partially methylated cyclodextrins are prepared by reacting β-cyclodextrin with more than about 30 equivalent proportions based on the β-cyclodextrin of dimethyl sulfate and more than about 30 equivalent proportions of an alkali metal hydroxide, wherein the concentration of reactants is greater than 10% (wt/wt).

8 Claims, 2 Drawing Sheets

PARTIALLY METHYLATED CYCLODEXTRINS AND PROCESS FOR PRODUCING THE SAME

This application is a continuation-in-part, of application Ser. No. 830,394, filed Feb. 18, 1986, now abandoned.

BACKGROUND OF THE INVENTION

1. Field of the Invention

This invention relates to partially methylated cyclodextrins with enhanced solubility in water, and to a process for producing the same.

2. Description of the Prior Art

As known methylated products of cyclodextrin (hereinafter abbreviated as "CD"), there may be mentioned hexakis-(2,6-di-O-methyl)-α-CD, heptakis-(2,6-di-O-methyl)-β-CD and heptakis-(2,3,6-tri-O-methyl)-β-CD. Processes for producing these methylated CD's are also known, in which CD is methylated with dimethyl sulfate or methyl iodide in an organic solvent, such as N,N-dimethylformamide (hereinafter abbreviated as "DMF") and dimethyl sulfoxide (hereinafter abbreviated as "DMSO") in the presence of barium oxide and/or barium hydroxide, or methylated by 9 to 30 equivalent proportions, based on CD, of dimethyl sulfate in water in the presence of 15 to 40 equivalent proportions of sodium hydroxide (for example, Chemical Abstract, 98, p.108 (1983); Starch/Stärke, 32, Nr. 5, pp.165–169 (1980)etc.).

CD is a group of cyclic oligosaccharides composed of several glucose units linked together through α-1,4 bond. These serve as host molecules to include various organic compounds, and have found use in pharmaceuticals, pesticides, perfumes, cosmetics, toiletries and other fields.

However, their low solubility in water and organic solvents, such as alcohol, has limited their widespread use in the above-mentioned applications. β-CD (composed of seven glucose units), which is capable of including a wide variety of compounds, is particularly low in water solubility, and hence its service concentration is very limited.

The art-known methylated CD's mentioned above were prepared principally from an incentive to characterize the structure of CD's. As stated later, these methylated products, though somewhat enhanced in solubility in water, still suffer from the above-mentioned disadvantage because the solubility tends to lower with increasing temperature.

Noting that the lower solubility of CD's in various solvents compared with linear oligosaccharides of the same number of glucose units is due to their peculiar molecular structure, we attempted to break away from the symmetric molecular structure of the art-known methylated CD's by preparing partially methylated CD's. This study led us to find that the above-mentioned problems can be solved by properly controlling the methylation degree at 3-hydroxyl groups in glucose units. The first part of this invention is based on these findings.

Thus this invention provides partially methylated CD's wherein the average degree of methylation at hydroxyl groups of different positions is about 53 to 64% for the 2-position about 38 to 51% for the 3-position and about 70 to 100% for the 6-position, when measured by gas chromatography analysis. More specifically, this invention provides partially methylated CD's represented by the following general formula

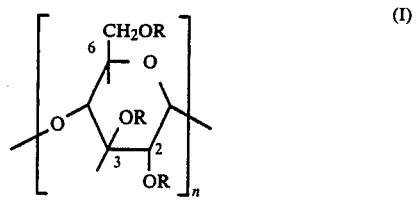

(wherein n is an integer from 6 to 8, and R expresses a hydrogen atom and/or methyl group), in which about two (on average) 3-hydroxyl groups in the molecule are methylated, and in which the 2- and 6-hydroxyl groups, which are far higher in reactivity than the 3-hydroxyl groups, are more completely methylated. The partially methylated CD as defined above may exist as a mixture of one compound in which a pair of glucose units with methylated 3-hydroxyl groups are adjacent to each other, with another compound in which these two glucose units are apart from each other across one or two glucose residues.

The second part of this invention is concerned with a process for efficiently producing the partially methylated CD's described above. More particularly it relates to a process for producing the partially methylated CD's as defined above by reaction of a CD with dimethyl sulfate, wherein more than about 30 equivalent proportions, based on CD, of dimethyl sulfate and more than about 30 equivalent proportions of an alkali metal hydroxide are used, and wherein the concentration of reactants is kept higher than 10% (wt/wt).

BRIEF DESCRIPTION OF THE DRAWINGS

The invention will be better understood by reference to the accompanying drawings, in which.

DETAILED DESCRIPTION OF THE PREFERRED EMBODIMENTS

Figure 1:
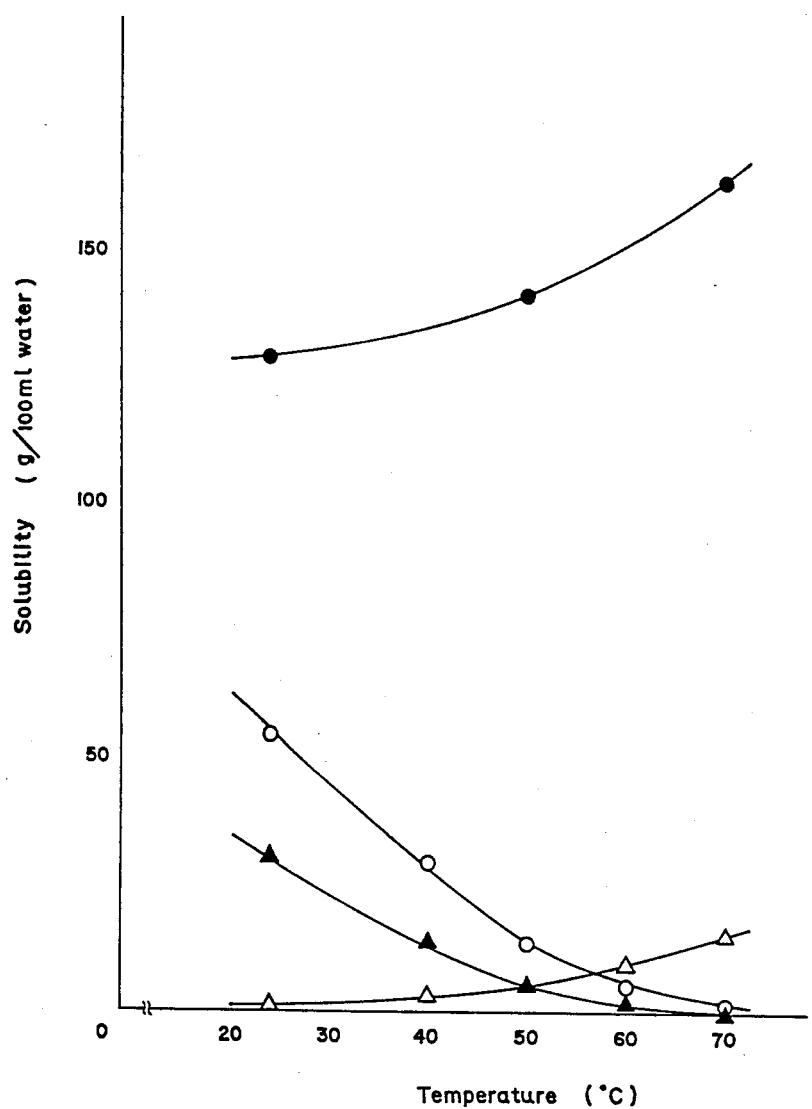
FIG. 1 is a water solubility graph of β-CD (Δ), heptakis-(2,6-di-O-methyl-β-CD (O), heptakis-(2,3,6,tri-O-methyl)-β-CD(▲) and a partially methylated β-CD mixture of the present invention(●)at different temperatures.

As a typical example of partially methylated β-CD's of this invention, there may be mentioned an isomeric mixture composed mainly of a partially methylated CD represented by formula (I) in which n is 7, said partially methylated β-CD having an average methylation degree, as measured by gas chromatography analysis, of about 53 to 64% for 2-hyroxyl groups (number of methylated glucose units in the molecule, x: about 6.7), about 38 to 51% for 3-hydroxyl groups (x: about 2.1), and about 70 to 100% for 6-hydroxyl groups (x: about 6.9), and having the following properties:

(A) Melting point: 142°–180° C. (capillary method)
(B) Solubility: About 133 grams dissolve in 100 ml water at 25° C.
(C) Specific rotation: $[\alpha]^{25}_D$: 155°–162° (c=1, water)

The partially methylated CD of the invention serves as host molecules to include various insoluble or slightly soluble compounds. In general, it can be used in the form of a mixture. However, in a field of use requiring uniformity, the partially methylated CD mixture separates to individual Rf value compositions, and these compositions are used.

The partially methylated CD mixture mentioned above is generally used. It separates to the following individual Rf value compositions:

(i) a composition having an Rf value of 0.55 [silica gel thin-layer chromatography (developer: chloroform/methanol=9/1)], average degree of methylation: 55–64% for 2-position, 43–51% for 3-position, 99–100% for 6-position, melting point (capillary method): 142°–161° C., and a specific rotation $[\alpha]_D^{25}$: 158°–162° (c=1, water);

(ii) a composition having an Rf value of 0.42 [silica gel thin-layer chromatography (developer: chloroform/methanol=9/1)], average degree of methylation: 55–60% for 2-position, 39–45% for 3-position, 86–88% for 6-position, melting point (capillary method): 159°–170° C.; and a specific rotation $[\alpha]_D^{25}$: 156°–159° (c=1, water; and (iii) a composition having an Rf value of 0.30 [silica gel thin-layer chromatography (developer: chloroform/methanol=9/1)], average degree of methylation: 53–61% for 2-position, 38–45% for 3-position, 70–77% for 6-position, melting point (capillary method): 167°–180° C., and a specific rotation: $[\alpha]_D^{25}$: 155°–159° (c=1, water).

Of the above-mentioned compositions, composition (i) is most preferred from the point of easy preparation and yield of producing.

The CD used in this invention may be any CD obtained by the known method, e.g., by the action of cyclodextrin-glucanotransferase (CGTase, E.C., 2.4.1.19.) upon starch. Thus CD herein means α-CD in which six glucose units are linked together through α-1,4 bond, β-CD in which seven glucose units are linked together, or γ-CD in which eight glucose units are linked together, or a mixture thereof. Of these, use of β-CD is most preferred for efficient control of the methylation degree and for production of partially methylated products of broad utility.

The amount of dimethyl sulfate used as methylating agent must be more than about 30 molar equivalents based on CD, and should preferably be in the range of 100 to 200 molar equivalents, although the optimum amount is somewhat dependent on the reactant concentration. As the alkali metal hydroxide used as accelerator may be mentioned lithium hydroxide, sodium hydroxide and potassium hydroxide. Of these, sodium hydroxide is preferable because of the low cost. Its amount must be more than about 30 molar equivalents, and should preferably be in the range of 80 to 200 molar equivalents, with the reactant concentration being set at a level higher than 10% (wt/wt), preferably in the range of 40 to 60% (wt/wt).

Any solvent which is substantially inert to the partial methylation may be used as reaction medium. Typical examples are water, DMF, DMSO, dioxane and mixtures thereof, but use of water alone is most preferred for ease of after-treatment.

The type and concentration of methylating agent and alkali are not critical to the reaction. However, the reaction is normally carried out with stirring at 10°–80° C. for one hour, preferably at 20°–50° C. for 5–20 hours.

Techniques commonly used in this field may be employed to isolate objective compounds from reaction mixtures. These include extraction with organic solvents, adsorption chromatography with activated charcoal, silica gel, alumina and other adsorbents, chromatograpy using, as carrier, cross-linked dextrin, styrene/divinylbenzene copolymers and other cross-linked polymers, and combinations thereof.

Methylating conditions are described in more detail in the following Experimental Examples.

EXPERIMENTAL EXAMPLE 1

Effect of NaOH concentration on methylation of β-CD

A mixture of β-CD 2.0 g ($1.76 \times 10^{-3}$ mole) and NaOH 12.8 g (0.32 mole, 180 molar proportions based on β-CD) was dissolved in water to make aqueous solutions of different concentrations shown in Table 1. To each of the solutions thus prepared, was slowly added dimethyl sulfate [30.0 ml, 0.317 mole (180 molar proportions)], and the mixture was stirred at room temperature for 17 hours. At the end of reaction, unreacted dimethyl sulfate was decomposed by addition of 50 ml of conc. ammonia water followed by mixing at room temperature for six hours. Methylated CD was extracted with chloroform, and the organic layer was washed with water until the washings were neutral pH and dried over anhydrous sodium sulfate. After distilling off the solvent from the dehydrated solution, the residue was treated with ethanol and then with water, the mixture was concentrated to dryness, and the solid product thus obtained was vacuum-dried in a desiccator.

The methylated CD thus prepared was dissolved in a small amount of chloroform, and the solution was chromatographed on a silical gel TLC plate (Merck, Art 5715). The chromatogram was developed by chloroform/methanol (9:1, v/v), and the plate was sprayed with $H_2SO_4$/ethanol reagent to bring out spots. Absorbance at 450 nm was measured for each spot by using a TLC scanner (Shimadzu Seisakusho Ltd., Model CS-920), and percentage composition for the methylated CD's contained (those corresponding to different Rf values) was determined from these data. The result is summarized in Table 1.

It is apparent from the table that, when the amounts of dimethyl sulfate and NaOH are both 180 molar proportions based on CD, the reaction proceeds at a NaOH concentration higher than 10% (wt/wt), but a concentration higher than 40% (wt/wt) is preferable to ensure satisfactory methylation.

TABLE 1

| NaOH Concn. (%, wt/wt) | Effect of NaOH Concentration | | | | | Unreacted Product |
|---|---|---|---|---|---|---|
| | Rf value | | | | | |
| | 0.55 | 0.42 | 0.30 | 0.17 | 0.05 | |
| 50 | 88.2 | 10.8 | 1.0 | — | — | — |
| 40 | 86.5 | 11.5 | 2.0 | — | — | — |
| 30 | 47.3 | 37.3 | 12.5 | 2.9 | — | — |
| 20 | 34.1 | 38.7 | 21.0 | 6.2 | — | — |
| 10 | 6.3 | 22.3 | 35.5 | 24.3 | 1.6 | + |
| 5 | trace | 1.1 | 5.1 | 8.6 | 0.2 | ++++ |

EXPERIMENTAL EXAMPLE 2

Effect of NaOH molar proportion on methylation of β-CD

β-CD (2.0 g, $1.76 \times 10^{-3}$ mole) was dissolved in 40% (wt/wt) aqueous solutions containing different molar proportions of NaOH as shown in Table 2. Dimethyl sulfate [30.0 ml, 0.317 mole (180 molar proportions based on CD)] was added, and the mixture was treated in the same manner as in Experimental Example 1. The result is summarized in Table 2.

It is apparent from the table that, when the amount of dimethyl sulfate is 180 molar proportions and the NaOH concentration is 40% (wt/wt), the reaction proceeds at NaOH molar proportions higher than 30, but a molar proportion in the range of 80 to 180 is preferable to ensure satisfactory methylation.

TABLE 2

Effect of NaOH Molar Proportion

| NaOH/β-CD | Rf value | | | | | Unreacted |
|---|---|---|---|---|---|---|
| (mole ratio) | 0.55 | 0.42 | 0.30 | 0.17 | 0.05 | Product |
| 227 | 36.2 | 27.4 | 22.4 | 13.2 | 0.8 | — |
| 180 | 86.5 | 11.5 | 2.0 | — | — | — |
| 121 | 82.1 | 15.9 | 2.0 | — | — | — |
| 80 | 80.4 | 17.6 | 2.0 | — | — | — |
| 50 | 38.9 | 35.3 | 17.6 | 2.5 | — | + |
| 40 | 36.6 | 38.7 | 14.8 | 2.9 | — | + |
| 30 | 19.6 | 30.0 | 27.8 | 10.6 | — | + |
| 20 | trace | trace | trace | trace | — | +++ |
| 10 | — | — | trace | trace | — | ++++ |

EXPERIMENTAL EXAMPLE 3

Effect of dimethyl sulfate molar proportion

β-CD (2.0 g, $1.76 \times 10^{-3}$ mole) was dissolved in 5.29 ml of 40% (wt/wt) aqueous caustic soda solution (30 molar proportions of NaOH), dimethyl sulfate (in amounts shown in Table 3) was slowly added dropwise to the β-CD solution prepared above, and the mixture was stirred at room temperature for 17 hours and treated in the same manner as in Experimental Example 1. The result is summarized in Table 3.

It is apparent from the table that the reaction proceeds, when more than 30 molar proportions of NaOH are used at 40% (wt/wt) concentration, at dimethyl sulfate molar proportions higher than 30, but a molar proportion in the range of 100 to 200 is preferable to ensure satisfactory methylation.

TABLE 3

Effect of Dimethyl Sulfate Molar Proportion

| Me$_2$SO$_4$/β-CD | Rf value | | | | | Unreacted |
|---|---|---|---|---|---|---|
| (mole ratio) | 0.55 | 0.42 | 0.30 | 0.17 | 0.05 | Product |
| 180 | 19.6 | 30.0 | 27.8 | 10.6 | — | + |
| 100 | 20.2 | 29.2 | 26.5 | 9.1 | — | + |
| 50 | 20.7 | 28.2 | 24.0 | 7.0 | — | ++ |
| 30 | 13.2 | 24.6 | 23.6 | 13.7 | — | ++ |
| 20 | 0.6 | 2.3 | 3.8 | 6.0 | 2.4 | ++++ |
| 10 | trace | trace | trace | trace | trace | +++++ |

As can be seen from FIG. 1, the partially methylated CD's definded in the first part of this invention show solubility in water several times higher than CD's and the art-known methylated CD's. What is of special note is the fact that the water solubility of the partially methylated CD's of this invention increases with increasing temperature, in contrast to the art-known methylated products whose solubility in water tends to fall with increasing temperature. This indicates potential uses of the partially methylated CD's of this invention under broader service conditions.

The process for producing partially methylated CD's specified by the second part of this invention employs a combination of dimethyl sulfate and an alkali metal hydroxide in specific quantities (a technique which breaks with conventional knowledge in this particular field), thereby controlling the methylation degree at 3-hydroxyl groups in all the glucose units involved to a desired level and producing objective compounds in high yields.

The following Examples will further illustrate this invention.

EXAMPLE 1

Ten grams ($8.81 \times 10^{-3}$ mole) of β-CD (RINGDEX-B, Sanraku Incorporated) was dissolved in 160 ml of 40% (wt/wt) aqueous caustic soda solution (1.60 moles, 182 molar proportions based on β-CD). To this solution was slowly added dropwise 150 ml of dimethyl sulfate (1.58 moles, 180 molar proportions) at room temperature, and stirring was continued for 17 hours. At the end of reaction, unreacted dimethyl sulfate was decomposed by addition of 208 ml of conc. ammonia water (1.50 moles) followed by stirring for six hours. Chloroform (400 ml) was added to the reaction mixture to extract methylated CD's, and the organic layer was washed with water until the washings were neutral and dried over anhydrous sodium sulfate. After distilling off the solvent from the dehydrated solution, the residue was treated with hot ethanol (50 ml), and the ethanol was removed by distillation. The residue was again treated with hot water (100 ml), and the water was distilled off. The dry solid product thus obtained was further vacuum-dried in a desiccator, giving 11.0 g of methylated β-CD. The mixture of methylated β-CD thus prepared had a solubility in water as shown in FIG. 1.

EXAMPLE 2

Average methylation degree values in the specification are measured by the so-called gas-chromatography method, which method will now be exemplified.

[A] Preparation of a sample providing measure for average methylation degree (1) Hydrolysis About 100 mg of the methylated β-CD of Example 1 is dissolved in 4.25 ml of water. 0.75 ml of trifluoroacetic acid is added to this solution and heated at 100° C. overnight. The reaction mixture is concentrated under reduced pressure to remove trifluoroacetic acid. A little water is added to the residue and concentrated under reduced pressure.

(2) Reduction

The concentrated residue is dissolved in 5 ml of water and the solution is cooled in an ice-water bath. 0.56 g of sodium boron hydride are added to the solution dropwise, then stirred for 4 hours at 0° C. After the reaction, unreacted sodium boron hydride is decomposed by addition by 30% acetic acid. The reaction mixture is stirred for an hour at 20° C., then passed 15 ml of Amberlite 1R-120B (H+ form) and concentrated under reduced pressure. A little methanol is added to the residue and again concentrated under reduced pressure.

(3) Acetylation 10 ml of pyridine and 5 ml of acetic acid anhydride are added to the residue of concentration, then stirred at 0° C. overnight. After the reaction, the reagent is distilled under reduced pressure below the temperature of 40° C. 60 ml of chloroform is added to the residue and washed in a saturated sodium chloride aqueous solution. The solution is dried over sodium sulfate and concentrated. 1 ml of acetone is added to the residue to obtain a sample for gas chromatography.

[B] Condition of gas chromatographic analysis

| Column: | 3% ECNSS-M (Shimadu Seisakusho Ltd.) | 2 m × 3 mmφ |
|---|---|---|
| Sapport: | Chromosorb W (AW-DMCS) | 100–120 mesh |
| Column temp.: | 180° C. | |
| Injection temp.: | 260° C. | |
| $N_2$ flow rate: | 22.5 ml/min | |
| $H_2$ press: | 0.6 kg/cm$^2$ | |

[C] Calculation of average degree of methylation

Figure 2:
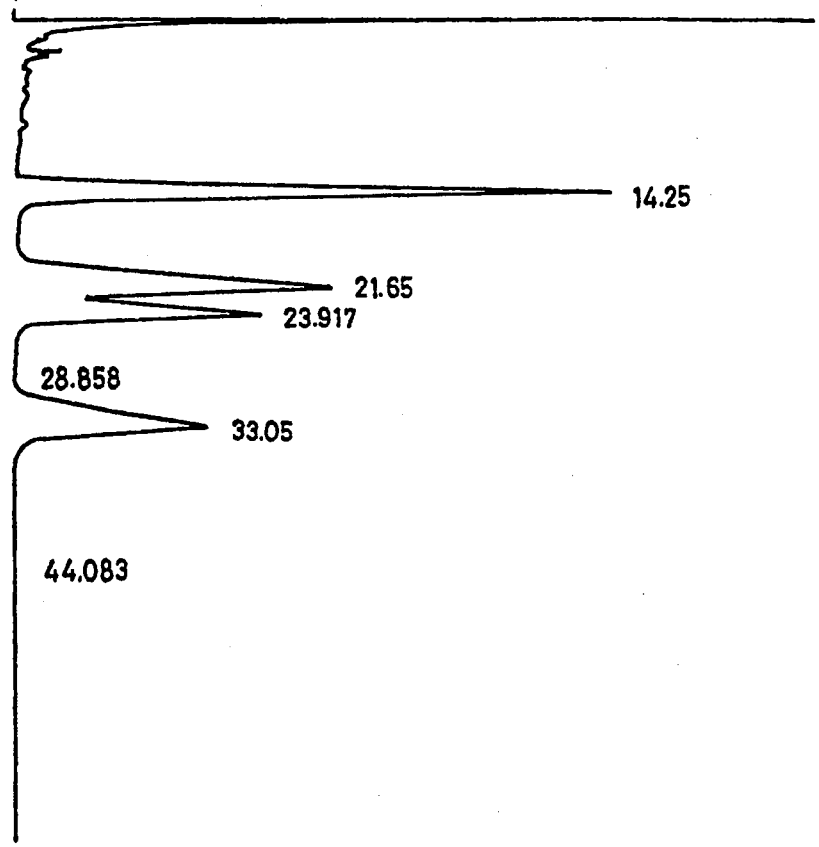
FIG. 2 is a gas chromatographic analysis of partially methylated cyclodextrins of the present invention.

From the gas chromatograph shown in FIG. 2, the rates of methylated acetyl glucose are computed. The rate is obtained by adding all rates of methylated acetyl glucose in each position (example 2, 3 and 6-position). The following rates are computed from FIG. 1:

| The rate of 2,3,6-tri-o-methylacetylglucose | 32.3014% |
|---|---|
| The rate of 2,6-di-o-methylacetyl glucose | 29.0594% |
| The rate of 3,6-di-o-methylacetylglucose | 16.9675% |
| The rate of 6-o-methylacetylglucose | 21.6717% |

The degree of methylation in 2-position is 61.3608%, which is obtained by adding the rate of 2,3,6-tri-o-methylacetylglucose, i.e. 32.3014% and the rate of 2,6-di-o-methylacetyl glucose, i.e., 29.0594%.

The degree of methylation in 3-position is 49.2689%, which is obtained by adding the rate of 2,3,6-tri-o-methylacetylglucose, i.e. 32.3014% and the rate of 3,6-di-o-methylacetylglucose, i.e., 16.9675%.

The degree of methylation in 6-position is 100%, which is obtained by adding the rate of 2,3,6-tri-o-methylacetylglucose, i.e., 32.3014% and the rate of 2,6-di-o-methylacetyl glucose, i.e., 29.0594%, the rate of 3,6-di-o-methylacetylglucose, i.e. 16.9675%, and the rate of 6-o-methylacetylglucose, i.e. 21.6717%.

What we claim is:

1. A partially methylated β-cyclodextrin composition having an average degree of methylation of hydroxyl groups at different positions in all glucose units involved of about 53–64% for the 2-position, about 38–51% for the 3-position, and about 70–100% for the 6-position.

2. A partially methylated β-cyclodextrin composition as defined in claim 1, wherein the composition has the following properties:
   (A) average degree of methylation
       2-position: 55–64%,
       3-position: 43–51%,
       6-position: 99–100%,
   (B) A melting point calculated by the capillary method of 142°–161° C.,
   (C) A specific rotation of $[\alpha]_D^{25}$: 158°–162° (c=1, water),
   and produces a single spot on a silica gel thin-layer chromatography having a developer: chloroform/methanol ratio of 9/1.

3. A partially methylated β-cyclodextrin composition as defined in claim 1, wherein the composition has the following properties:
   (A) Average degree of methylation
       2-position: 55–60%,
       3-position: 39–45%,
       6-position: 86–88%,
   (B) A melting point calculated by the capillary method of 159–°170° C.,
   (C) A specification rotation of $[\alpha]_D^{25}$: 156°–159° (c=1, water),
   and produces a single spot on a silica gel thin-layer chromatography having a developer: chloroform/methanol ratio of 9/1.

4. A partially methylated β-cyclodextrin composition as claimed in claim 1, wherein the composition has the following properties:
   (A) Average degree of methylation
       2-position: 53–61%,
       3-position: 38–45%,
       6-position: 70–77%,
   (B) A melting point calculated by the capillary method of 167°–180° C.,
   (C) A specific rotation of $[\alpha]_D^{25}$: 167°–180° (c=1, water),
   and produces a single spot on a silica gel thin-layer chromatography having a developer: chloroform/methanol ratio of 9/1.

5. A process for producing a partially methylated β-cyclodextrin composition having an average degree of methylation at hydroxyl groups at different positions in all glucose units involved of about 53–64% for the 2-position, about 38–51% for the 3-position, and about 70–100% for the 6-position comprising reacting a β-cyclodextrin with more than about 30 equivalent proportions of dimethyl sulfate based on said β-cyclodextrin and more than about 30 equivalent proportions of sodium hydroxide based on said β-cyclodextrin, wherein the concentration of dimethyl sulfate and sodium hydroxide is greater than 10% wt/wt.

6. A process for producing a partially methylated β-cyclodextrin composition as defined in claim 5, wherein the equivalent proportion of dimethyl sulfide is 100 to 200, the equivalent proportion of sodium hydroxide is 80 to 200, and the concentration is 40 to 60% wt/wt.

7. A process for producing a partially methylated β-cyclodextrin composition as defined in claim 5, wherein the reaction is carried out with stirring at 10° to 80° C. for at least one hour.

8. A process for producing a partially methylated β-cyclodextrin composition as defined in claim 7, wherein the reaction is carried out with stirring at 20° to 50° C. for 5 to 20 hours.

* * * * *